(12) United States Patent
Merlino et al.

(10) Patent No.: US 10,196,997 B2
(45) Date of Patent: Feb. 5, 2019

(54) ENGINE CONTROL SYSTEM INCLUDING FEED-FORWARD NEURAL NETWORK CONTROLLER

(71) Applicant: GM Global Technology Operations LLC, Detroit, MI (US)

(72) Inventors: Gennaro Merlino, Turin (IT); Giuseppe Conte, Turin (IT); Ezio Spessa, Turin (IT); Roberto Finesso, Chivasso (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/467,053

(22) Filed: Mar. 23, 2017

(65) Prior Publication Data

US 2018/0179975 A1    Jun. 28, 2018

Related U.S. Application Data

(60) Provisional application No. 62/438,065, filed on Dec. 22, 2016.

(51) Int. Cl.
*F02D 41/14* (2006.01)
*F02D 41/30* (2006.01)
(Continued)

(52) U.S. Cl.
CPC ........ *F02D 41/1405* (2013.01); *F02D 11/105* (2013.01); *F02D 41/0002* (2013.01);
(Continued)

(58) Field of Classification Search
CPC .. F02D 41/1405; F02D 41/0002; F02D 41/26; F02D 41/30; F02D 41/1401; F02D 41/1458; F02D 41/2454; F02D 41/187; F02D 41/3035; F02D 41/1406; F02D 41/141; F02D 41/1411; F02D 41/1412; F02D 41/1454; F02D 41/40; F02D 41/401; F02D 2200/0611; F02D 2200/602;
(Continued)

(56) References Cited

U.S. PATENT DOCUMENTS

5,361,213 A * 11/1994 Fujieda ............... B60K 31/0008
123/406.38
6,088,647 A * 7/2000 Hemberger ........... F02D 41/008
123/478
(Continued)

*Primary Examiner* — Lindsay Low
*Assistant Examiner* — George Jin
(74) *Attorney, Agent, or Firm* — Cantor Colburn LLP (57) ABSTRACT

An automotive internal combustion engine combusts an air/fuel mixture to generate a drive torque. An engine control unit (ECU) determines a torque request to output a fuel request signal indicative of an amount of the fuel to inject into a cylinder of the engine. The ECU includes neural network controller installed with a neural network to generate a fuel setpoint signal based on the torque request and to define a combustion model of the engine. The neural network generates a start of injection (SOI) signal indicating a start time at which to inject the fuel based a crankshaft angle. The ECU further outputs the fuel request signal based on the fuel setpoint and the SOI. A fuel injector injects the fuel into the cylinder based on the fuel request signal to generate the drive torque indicated by the torque request.

20 Claims, 3 Drawing Sheets

(51) Int. Cl.
*F02D 41/00* (2006.01)
*F02D 41/26* (2006.01)
*F02D 41/40* (2006.01)
*F02D 11/10* (2006.01)

(52) U.S. Cl.
CPC ............ *F02D 41/26* (2013.01); *F02D 41/30* (2013.01); *F02D 41/401* (2013.01); *F02D 41/403* (2013.01); *F02D 2041/1433* (2013.01); *F02D 2200/0611* (2013.01); *F02D 2200/101* (2013.01); *F02D 2200/602* (2013.01)

(58) Field of Classification Search
CPC ....... F02D 2200/101; F02D 2041/1433; F02D 2041/141; F02D 2041/001; F02D 2041/0015; F02D 2041/1411; F02D 2041/1412; F02D 35/021; F02D 35/028; F02D 13/0215
See application file for complete search history.

(56) References Cited

U.S. PATENT DOCUMENTS

| | | | |
|---|---|---|---|
| 7,120,533 B2 * | 10/2006 | Cesario | F02D 41/1405 701/106 |
| 2006/0069493 A1 * | 3/2006 | Attard | F02D 35/021 701/106 |
| 2009/0005953 A1 * | 1/2009 | Cesario | F02D 35/023 701/102 |
| 2009/0259385 A1 * | 10/2009 | Loeffler | F02D 35/023 701/102 |
| 2011/0172897 A1 * | 7/2011 | Tsuzuki | F02D 35/023 701/103 |

* cited by examiner

ENGINE CONTROL SYSTEM INCLUDING FEED-FORWARD NEURAL NETWORK CONTROLLER

CROSS REFERENCE TO RELATED APPLICATION

This application claims priority from U.S. Provisional Application Ser. No. 62/438,065, filed Dec. 22, 2016, the contents of which are incorporated herein by reference in its entirety.

INTRODUCTION

The subject disclosure relates to internal combustion engines, and more particularly, to engine control systems implemented in automotive vehicles.

Internal combustion engines combust an air and fuel mixture within cylinders to drive pistons, which produces drive torque for driving an automotive vehicle. Air flow into the engine is regulated via a throttle. More specifically, the throttle adjusts a throttle area, which increases or decreases air flow into the engine. As the throttle area increases, the air flow into the engine increases. A fuel control system adjusts the rate at which fuel is injected to provide a desired air/fuel mixture to the cylinders to achieve a desired torque output. Increasing the amount of air and fuel provided to the cylinders increases the torque output of the engine.

Engine control systems employ an engine control unit (ECU), which is a hard ware electronic controller that stores executable software, algorithms and software in memory to control operation of the engine. For instance, the ECU stores Torque-To-Fuel maps that estimate the combustion efficiency, e.g. an estimation of the fuel needed to achieve drive torque requests input by the vehicle driver. This map-based approach, however, typically requires recalibration of toque-to-fuel calibrations throughout the life of the vehicle in order to maintain a targeted combustion efficiency.

SUMMARY

According to at least one non-limiting embodiment, an automotive internal combustion engine includes a cylinder for combusting a mixture of air and fuel, and a crankshaft rotatably coupled to the internal combustion engine to generate a drive torque in response to combusting the mixture of air and fuel. An engine fuel control system includes a fuel injector configured to inject the fuel into the cylinder. The automotive vehicle further includes an engine control unit (ECU) configured to determine a torque request to output a fuel request signal indicative of an amount of the fuel to inject into the cylinder. The ECU includes a neural network controller configured to generate a fuel setpoint signal based on the torque request and a neural network that defines a combustion model of the internal combustion engine. The ECU also generates a start of injection (SOI) signal indicating a start time at which to inject the fuel based on a rotational angle of the crankshaft and the combustion model defined by the neural network, and outputs the fuel request signal based on the fuel setpoint signal and the SOI signal. The fuel injector injects the fuel into the cylinder based on the fuel request signal to generate the drive torque indicated by the torque request.

In further features, the neural network includes at least one neuron that defines the combustion model.

In further features, the at least one neuron includes a plurality of neurons ranging from 10 neurons to 20 neurons.

In still further features, the torque request is based on a brake torque request.

In yet still further features, the brake torque request is based on at least one of an axle torque, frictional loss realized by the internal combustion engine, and a pumping energy loss realized by the internal combustion engine.

In still further features, an engine air control system includes a throttle valve configured to adjust the air delivered into the cylinder.

In yet still further features, the engine air control system adjusts the throttle valve to vary the air delivered into the cylinder based on the fuel request signal.

According to another non-limiting embodiment, an engine control system is configured to control an internal combustion engine. The engine control system comprises at least one air/fuel sensor configured to measure at least one of an amount air delivered to a cylinder of the internal combustion engine and an amount of fuel delivered to the cylinder of the internal combustion engine. A crankshaft sensor is configured to measure at least one of a rotational angle of a crankshaft rotatably coupled to the internal combustion engine and a rotational speed of the crankshaft. The engine control system further includes an engine fuel control system and an engine control unit (ECU). The engine fuel control system includes a fuel injector configured to inject the fuel into the cylinder. The ECU is in signal communication with the at least one air/fuel sensor, the crankshaft sensor, and the engine fuel control system. The ECU is configured to determine a torque request to output a fuel request signal indicative of an amount of the fuel to inject into the cylinder. The engine control unit includes a neural network controller configured to generate a fuel setpoint signal based on the torque request and a combustion model of the internal combustion engine defined by a neural network installed in the neural network controller. The neural network controller further generates a start of injection (SOI) signal indicating a start time at which to inject the fuel based on the rotational angle of the crankshaft and the combustion model generated by the neural network. The ECU outputs the fuel request signal based on the fuel setpoint signal and the SOI signal, and the fuel injector injects the fuel into the cylinder based on the fuel request signal to generate the drive torque indicated by the torque request.

In further features, the neural network includes at least one neuron that defines the combustion model.

In further features, the at least one neuron includes a plurality of neurons ranging from 10 neurons to 20 neurons.

In further features, the torque request is based on a brake torque request input to the ECU.

In still further features, the brake torque request is based on at least one of an axle torque applied to the crankshaft, frictional loss realized by the internal combustion engine, and a pumping energy loss realized by the internal combustion engine.

In still further features, an engine air control system includes a throttle valve configured to adjust the air delivered into the cylinder.

In yet still further features, the engine air control system adjusts the throttle valve to vary the air delivered into the cylinder based on the fuel request signal.

According to yet another non-limiting embodiment, a method of controlling an automotive vehicle comprises delivering a mixture of air and fuel into a cylinder of an internal combustion engine installed on the automotive vehicle, combusting the mixture of air and fuel in the cylinder, and generating a drive torque, via a crankshaft rotatably coupled to the internal combustion engine, in response to combusting the mixture of air and fuel. The method further includes generating, via a neural network controller including a neural network, a fuel setpoint signal based on a torque request input to the automotive vehicle. The method further includes defining, via the neural network controller, a combustion model of the internal combustion engine, and generating, via the neural network, a start of injection (SOI) signal indicating a start time at which to inject the fuel based on a rotational angle of the crankshaft. The method further includes outputting a fuel request signal indicative of an amount of the fuel to inject into the cylinder based on the torque request. The fuel request signal is generated according to the fuel setpoint signal and the SOI signal. The method further includes injecting the fuel into the cylinder based on the fuel request signal to generate the drive torque indicated by the torque request.

In further features, the neural network includes at least one neuron that defines the combustion model.

In further features, the at least one neuron includes a plurality of neurons ranging from 10 neurons to 20 neurons.

In still further features, the torque request is based on a brake torque request input to the vehicle.

In still further features, the brake torque request is based on at least one of an axle torque, frictional loss realized by the internal combustion engine, and a pumping energy loss realized by the internal combustion engine.

In yet still further features, the method includes adjusting a position of a throttle valve to vary the air delivered into the cylinder based on the fuel request signal.

The above features of the disclosure are readily apparent from the following detailed description when taken in connection with the accompanying drawings.

BRIEF DESCRIPTION OF THE DRAWINGS

Other features and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that can include an application specific integrated circuit (ASIC), an electronic circuit, a processor (shared, dedicated, or group) and memory that executes one or more software or firmware programs, a combinational logic circuit, and/or other suitable components that provide the described functionality.

Various non-limiting embodiments provide a vehicle including an engine control system configured to actively control operation of a vehicle's internal combustion engine. Fuel demand and combustion efficiency can be determined based on, for example, the crank angle at which 50% of fuel mass is burnt (i.e., MFB50) and an indicated torque request input by a driver of the vehicle. The indicated torque request can be determined based on, among other parameters, brake effective mean pressure (BMEP). The engine control system includes an engine control unit (ECU) that implements a feed-forward neural network which actively manages fuel demand and combustion efficiency of the engine, as opposed to torque-to-fuel maps. Because fuel demand and combustion efficiency is actively managed, continuous calibration efforts are unnecessary over the lifespan of the vehicle, as is the case when implementing torque-to-fuel maps.

In addition, the feed-forward neural network employed in the ECU, according to at least one non-limiting embodiment, is trained to learn and predict MFB50 and indicated torque requests (e.g., BMEP) prior to being installed in the ECU. Accordingly, the neural network controller implemented with the trained neural network significantly reduces computation times compared to traditional engine control units that utilize physical models.

Figure 1:
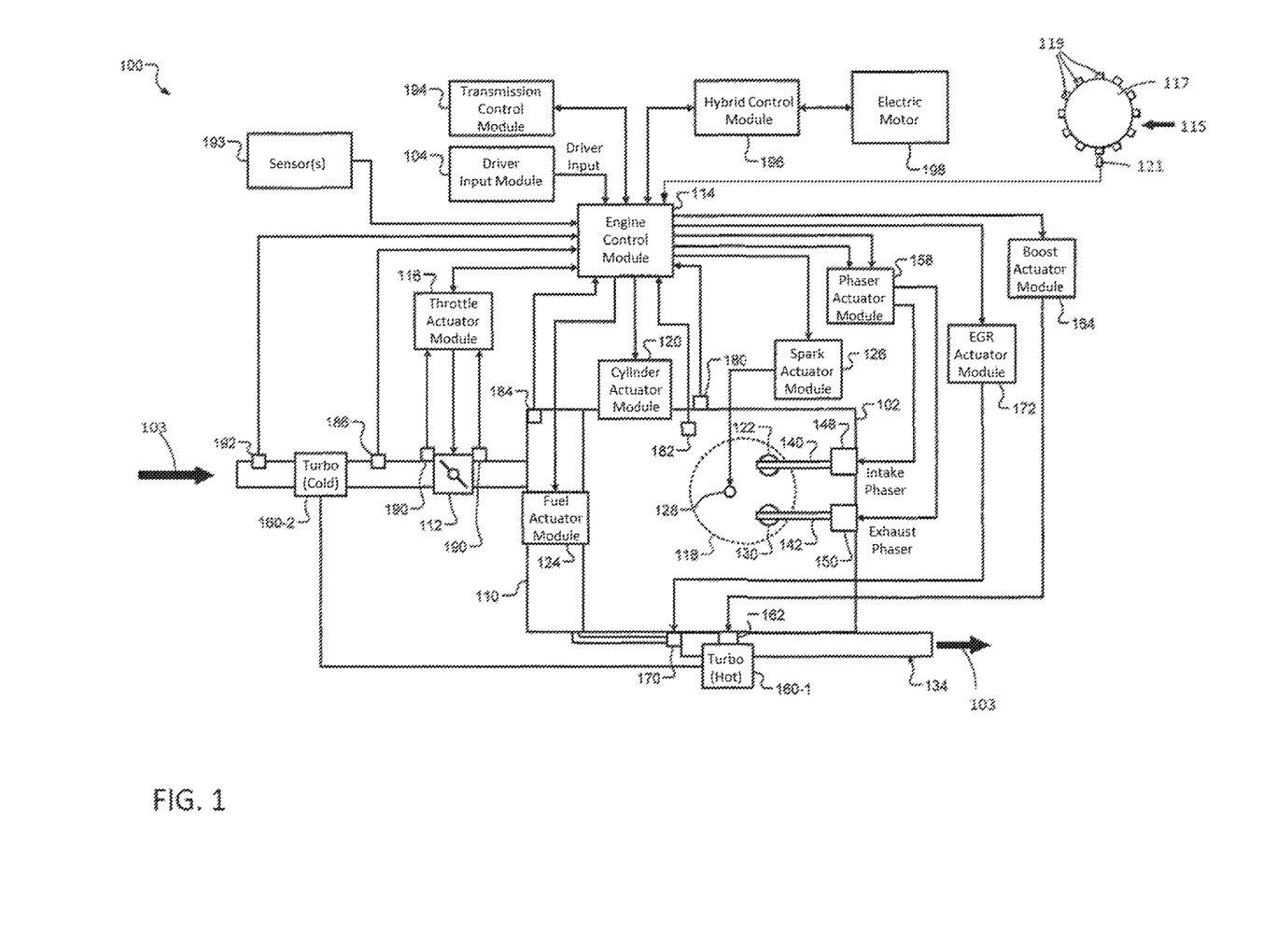
FIG. 1 is a diagram illustrating an engine system including an ECU that employs a feed-forward neural network controller to actively control fuel demand and combustion efficiency according to a non-limiting embodiment.

Referring now to FIG. 1, a functional block diagram of an example engine system 100 implemented in an automotive vehicle (not shown) is presented. The engine system 100 includes an engine 102 that combusts an air/fuel mixture to produce drive torque for a vehicle based on a driver input processed by a driver input module 104.

Air 103 is drawn into an intake manifold 110 through a throttle valve 112. For example only, the throttle valve 112 can include a butterfly valve having a rotatable blade. An engine control unit (ECU) 114 controls various engine operations and sub-systems. For example, the ECU 114 controls a throttle actuator module 116, which regulates opening of the throttle valve 112 to control the amount of air 103 drawn into the intake manifold 110.

Air 103 from the intake manifold 110 is drawn into cylinders of the engine 102. While the engine 102 can include multiple cylinders, for illustration purposes a single representative cylinder 118 is shown. The engine 102 can include 2, 3, 4, 5, 6, 8, 10, and/or 12 cylinders. The ECU 114 can instruct a cylinder actuator module 120 to selectively deactivate some of the cylinders 118, which can improve fuel economy under certain engine operating conditions.

A multi-tooth wheel 117 is attached to the crankshaft 115 and rotates therewith. The multi-tooth wheel 117 includes a plurality of individual teeth 119. A crankshaft sensor 121 is configured to monitor a rotational angle of the crankshaft 115 that can be utilized to determine an angular position of the crankshaft with respect to a reference point, and to output a crank angle signal to the ECU 114 based on a position of one more of the teeth 119. The crankshaft sensor 121 is also capable of determining crankshaft (i.e. engine) speed (RPM) through sensing edges on the teeth 119 of the multi-tooth wheel 117. Various types of sensors can be utilized as the crankshaft sensor 121 including, but not limited to, a Hall-effect sensor, an inductive sensor, or a magnetoresistive sensor.

The crankshaft 115 is rotatably coupled to a vehicle transmission (not shown), to deliver tractive torque thereto, in response to an operator torque request. The engine 102 employs, for example, a four-stroke operation wherein each engine combustion cycle includes 720 degrees of angular rotation of the crankshaft 115 divided into four 180-degree stages (intake-compression-expansion-exhaust); which are descriptive of the reciprocating movement of a piston (not shown) in the cylinder 118. During each revolution of the crankshaft 115 two of the four strokes occur within the cylinder 118. Therefore, two crankshaft revolutions are necessary for the cylinder 118 to experience all four of the strokes.

During the intake stroke, air 103 from the intake manifold 110 is drawn into the cylinder 118 through an intake valve 122. The ECU 114 controls a fuel actuator module 124, which regulates fuel injection to achieve a target air/fuel ratio. Fuel can be injected into the intake manifold 110 via one or more fuel injectors (not shown). The fuel can be injected at a central location or at multiple locations, such as near the intake valve 122 of each of the cylinders. In various implementations (not shown), fuel can be injected directly into the cylinders or into mixing chambers associated with the cylinders. The fuel actuator module 124 can halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture.

In embodiments where the engine system 100 includes a spark-ignition engine, a spark actuator module 126 can be provided to energize a spark plug 128 in the cylinder 118 based on a signal from the ECU 114, the spark plug 128 ignites the air/fuel mixture. The timing of the spark can be specified relative to the time when the piston is at its topmost position, referred to as top dead center (TDC). In embodiments where the engine is a compression-ignition engine such as a diesel engine, for example, the actuator module 126 and spark plug 128 are omitted from the engine system 100.

The spark actuator module 126 can be controlled by a timing signal specifying how far before or after TDC to generate the spark. Because piston position is directly related to crankshaft rotation, operation of the spark actuator module 126 can be synchronized with crankshaft angle. Generating spark can be referred to as a firing event. The spark actuator module 126 can have the ability to vary the timing of the spark for each firing event. The spark actuator module 126 can vary the spark timing for a next firing event when the spark timing is changed between a last firing event and the next firing event. The spark actuator module 126 can halt spark delivery to deactivated cylinders.

During the combustion stroke, the combustion of the air/fuel mixture drives the piston away from TDC, thereby driving the crankshaft. The combustion stroke can be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion contained in exhaust gas 103 are exhausted from the vehicle via an exhaust system 134.

The intake valve 122 can be controlled by an intake camshaft 140, while the exhaust valve 130 can be controlled by an exhaust camshaft 142. In various implementations, multiple intake camshafts (including the intake camshaft 140) can control multiple intake valves (including the intake valve 122) for the cylinder 118 and/or can control the intake valves (including the intake valve 122) of multiple banks of cylinders (including the cylinder 118). Similarly, multiple exhaust camshafts (including the exhaust camshaft 142) can control multiple exhaust valves for the cylinder 118 and/or can control exhaust valves (including the exhaust valve 130) for multiple banks of cylinders (including the cylinder 118). In various other implementations, the intake valve 122 and/or the exhaust valve 130 can be controlled by devices other than camshafts, such as camless valve actuators. The cylinder actuator module 120 can deactivate the cylinder 118 by disabling opening of the intake valve 122 and/or the exhaust valve 130.

The time when the intake valve 122 is opened can be varied with respect to piston TDC by an intake cam phaser 148. The time when the exhaust valve 130 is opened can be varied with respect to piston TDC by an exhaust cam phaser 150. A phaser actuator module 158 can control the intake cam phaser 148 and the exhaust cam phaser 150 based on signals from the ECU 114. When implemented, variable valve lift (not shown) can also be controlled via the phaser actuator module 158.

The engine system 100 can include a turbocharger that includes a turbine 160-1 that is powered by hot exhaust gases flowing through the exhaust system 134. The turbocharger also includes a cold air compressor 160-2 that is driven by the turbine 160-1. The compressor 160-2 compresses air 103 entering the throttle valve 112. In various implementations, a supercharger (not shown), driven by the crankshaft, can compress air 103 delivered to the throttle valve 112 and deliver the compressed air to the intake manifold 110.

A wastegate (i.e., bypass line) 162 can allow exhaust to bypass the turbine 160-1, thereby limiting boost (the amount of intake air compression) provided by the turbocharger. A boost actuator module 164 can control the boost of the turbocharger by controlling opening of the wastegate 162. In various implementations, two or more turbochargers can be implemented and can be controlled by the boost actuator module 164.

An air cooler (not shown) can transfer heat from the compressed air charge to a cooling medium, such as engine coolant or air. The compressed air charge can receive heat, for example, via compression and/or from components of the exhaust system 134. Although shown separated for purposes of illustration, the turbine 160-1 and the compressor 160-2 can be attached to each other, placing intake air in close proximity to hot exhaust.

The engine system 100 can include an exhaust gas recirculation (EGR) valve 170, which selectively redirects exhaust gas back to the intake manifold 110. The EGR valve 170 can be located upstream of the turbocharger turbine 160-1. The EGR valve 170 can be controlled by an EGR actuator module 172 based on signals from the ECU 114.

A temperature of the engine coolant can be measured using an engine coolant temperature (ECT) sensor 182. The ECT sensor 182 can be located within the engine 102 or at other locations where the coolant is circulated, such as a radiator (not shown).

A pressure within the intake manifold 110 can be measured using a manifold absolute pressure (MAP) sensor 184. In various implementations, engine vacuum, which is the difference between ambient air pressure and the pressure within the intake manifold 110, can be measured. A mass flow rate of air 103 flowing into the intake manifold 110 can be measured using a mass air flow (MAF) sensor 186. In various implementations, the MAF sensor 186 can be located in a housing that also includes the throttle valve 112.

The throttle actuator module 116 can monitor the position of the throttle valve 112 using one or more throttle position sensors (TPS) 190. An ambient temperature of air 103 being drawn into the engine 102 can be measured using an intake air temperature (IAT) sensor 192. The engine system 100 can also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECU 114 can use signals from the sensors to make control decisions for the engine system 100.

The ECU 114 can communicate with a transmission control module 194 to coordinate shifting gears in a transmission (not shown). For example, the ECU 114 can reduce engine torque during a gear shift. The ECU 114 can communicate with a hybrid control module 196 to coordinate operation of the engine 102 and an electric motor 198.

The electric motor 198 can also function as a generator, and can be used to produce electrical energy for use by vehicle electrical systems and/or for storage in a battery. In various implementations, various functions of the ECU 114, the transmission control module 194, and the hybrid control module 196 can be integrated into one or more modules.

Each system that varies an engine parameter can be referred to as an engine actuator. For example, the throttle actuator module 116 can adjust opening of the throttle valve 112 to achieve a target throttle opening area.

The spark actuator module 126 (if employed in spark-ignition engines) controls the spark plugs to achieve a target spark timing relative to piston TDC.

The fuel actuator module 124 controls the fuel injectors to achieve target fueling parameters.

The phaser actuator module 158 can control the intake and exhaust cam phasers 148 and 150 to achieve target intake and exhaust cam phaser angles, respectively.

The EGR actuator module 172 can control the EGR valve 170 to achieve a target EGR opening area. For instance, the EGR actuator module 172 determines a proper EGR valve position so as to recirculate engine exhaust gas to inlet manifold 110. The recirculated portion of the engine's exhaust gas back to the engine cylinders 118 dilutes the oxygen ($O_2$) in the incoming air stream and provides gases inert to combustion to act as absorbents of combustion heat, to reduce peak in-cylinder temperatures. Accordingly, the EGR can lower the level of certain undesirable engine emission components such as oxides of nitrogen (NOx) and can improve fuel economy.

The boost actuator module 164 controls the wastegate 162 to achieve a target wastegate opening area. Accordingly, the boost actuator module 164 can allow exhaust to bypass the turbine 160-1, thereby reducing the boost (the amount of intake air compression) provided by a turbocharger.

The cylinder actuator module 120 controls cylinder deactivation to achieve a target number of activated or deactivated cylinders.

The ECU 114 generates the target values for the engine actuators to cause the engine 102 to generate a target engine output torque. The ECU 114 generates the target values for the engine actuators using model predictive control, as discussed further herein.

Figure 2:
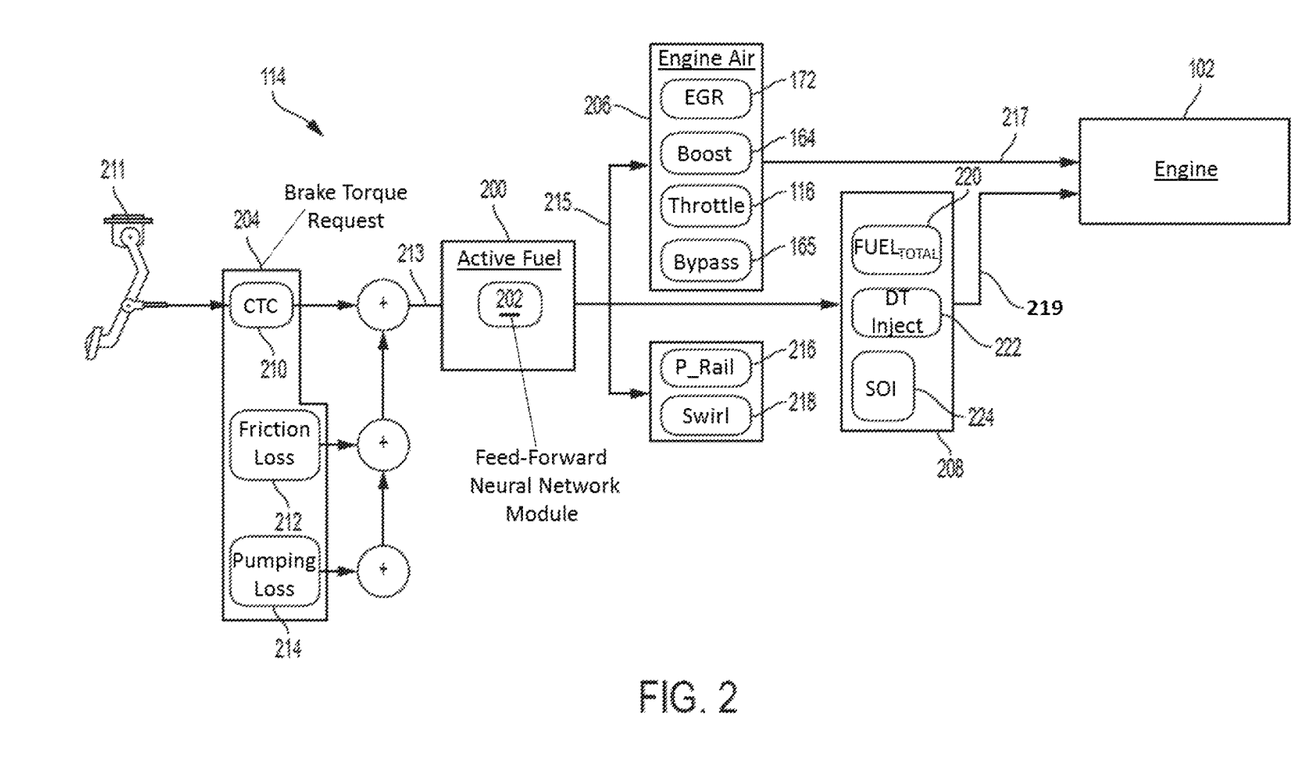
FIG. 2 is a diagram of an ECU including an active fuel demand controller that implements a feed-forward neural network controller according to a non-limiting embodiment.

Turning now to FIG. 2, an ECU 114 that includes an active fuel demand controller 200 which implements a feed-forward neural network module 202 is illustrated according to a non-limiting embodiment. In at least one embodiment, the feed-forward neural network module 202 is constructed as an electronic hardware controller that includes memory and a processor configured to execute algorithms and computer-readable program instructions stored in the memory. Along with the active fuel demand controller 200, the ECU 114 includes a brake torque request controller 204, an engine air control system 206, and an engine fuel control system 208.

The brake torque request controller 204 includes a coordinated torque control (CTC) module 210, a friction loss module 212, and a pumping loss module 214. Each of the coordinated torque control (CTC) module 210, the friction loss module 212, and the pumping loss module 214 can be constructed as an electronic hardware controller that includes memory and a processor configured to execute algorithms and computer-readable program instructions stored in the memory. Overall vehicle torque request can be varied according to the brake torque requested by the vehicle operator, and other torque or energy losses occurring during vehicle operation. The outputs of the CTC module 210, friction loss module 212, and pumping loss module 214 are summed together to generate an indicated torque request signal 213 which is delivered to the active fuel demand controller 200. Thus, instead of estimating the fuel request as is the case in conventional engine control systems, at least one embodiment described herein actively manages the fuel request based on the indicated torque request 213 during operation of the vehicle. In addition, the fuel request can be actively managed based on real-time variations in the engine air control system 206

Brake torque can be requested via a brake pedal 211, for example. The CTC module 210 is configured to control the engine 102 to produce an axle torque (i.e., a torquing force applied to a crankshaft of the vehicle) equal to the immediate torque request. Different combinations of actuator values can result in the same axle torque. The CTC module 210 can therefore adjust the actuator values to allow a faster transition to the predicted torque request, while still maintaining the axle torque at the immediate torque request.

Drive torque output by the engine 102 can be less than combustion torque actually generated by the engine. For example, engine friction can contribute to frictional energy losses. The difference between combustion torque and drive torque can be referred to as "friction torque." Accordingly, the friction loss module 212 is configured to determine an amount of torque lost during an engine cycle. The pumping loss module 214 is provided to determine additional energy losses resulting from pumping losses that can occur during a non-expansion engine cycle and/or additional loads on the engine 102 from accessory devices.

The engine air control system 206 and the engine fuel control system 208 are in signal communication with the active fuel demand controller 200. Based on a fuel request signal 215 (i.e., the fuel request determined by the active fuel demand controller 200) the engine air control system 206 outputs an air system setpoint signal 217 and the engine fuel control system 208 outputs an injector setpoint signal 219, respectively. The air system setpoint signal 217 can control a position of the throttle valve 112 so as to throttle an amount of air entering the engine system while the injector setpoint signal 219 controls an amount of fuel injected into the cylinders 118.

The engine air control system 206 includes the EGR actuator module 172, the boost actuator module 164, the throttle actuator module 116, and a bypass module 165. Each of the EGR actuator module 172, the boost actuator module 164, the throttle actuator module 116, and the bypass module 165 can be constructed as an electronic hardware controller that includes memory and a processor configured to execute algorithms and computer-readable program instructions stored in the memory. In addition, each of the aforementioned modules can operate independently from one another based on the fuel request signal 215 output by the active fuel demand controller 200 in order to meet the indicated torque request 213 input by an operator of the vehicle.

The ECU 114 may also include a rail pressure (P_rail) module 216, and a chamber swirl module 218. The P_rail module 216, and the chamber swirl module 218 can be constructed as an electronic hardware controller that includes memory and a processor configured to execute algorithms and computer-readable program instructions stored in the memory. The P_rail module 216 pressurizes fuel to assist in fuel injection to the cylinders 118. For instance, pressurized fuel is supplied to the injectors which deliver fuel to the engine 102. Such regulation of fuel delivered to the fuel injectors has been shown to promote improved fuel spray formation and distribution within the combustion chambers of the cylinders 118; leading to benefits such as improved emissions, fuel economy, and engine operating stability. Accordingly, based on the fuel request signal 215 output from the active fuel demand controller 200, the P_rail module 216 meters the fuel in order to regulate the amount of pressurized fuel necessary to deliver a desired amount of fuel to the cylinder 118 to meet the indicated torque request 213.

The chamber swirl module 218 is configured to determine a ratio of air/fuel to be swirled in the cylinder 118. Diesel engines, for example, can realize improved combustion by mixing fuel droplets injected into the combustion chamber with compressed air. Accordingly, based on the fuel request signal 215 output from the active fuel demand controller 200, the engine air control system 206 can output a control signal that adjusts an opening angle (i.e., opening degree) of a swirl control valve (not shown) to generate a swirl of air-fuel mixture delivered to the cylinders 118.

The engine fuel control system 208 includes a total fuel calculation module 220, a dwell time (DT) injection module 222, and a start of injection (SOI) module 224. Any one of the total fuel calculation module 220, the dwell time (DT) injection module 222, and the SOI module 224 can be constructed as an electronic hardware controller that includes memory and a processor configured to execute algorithms and computer-readable program instructions stored in the memory.

In a fuel injection phase and in the corresponding fuel combustion phase in an engine cylinder, the DT injection module 222 generates at least a first electrical command of a predetermined time duration to perform a pilot fuel injection (Q), and a subsequent electrical command of a time duration depending upon the engine operating conditions to perform a main fuel injection. The two electrical commands are separated in time by an electrical dwell time such that the main fuel injection starts without interruption with respect to the pilot fuel injection, (i.e., the instantaneous fuel flow-rate during the fuel injection phase assumes a so-called "two-hump" profile).

The SOI module 224 determines SOI times and end of injection (EOI) times of the fuel injectors. For instance, monitored time points associated with the single fuel injection event include a commanded SOI time and a commanded EOI time. The commanded SOI time can be based on an actual SOI time and a sensed SOI time, while the commanded EOI time can be based on an actual EOI time and a sensed EOI time. The actual SOI time and the actual EOI time define an actual injection time, which correlates to actual flow of fuel as indicated by the injection flowrate. The sensed SOI time and the sensed EOI time represent time points that are associated with discernible changes in monitored parameters of the fuel injection system. The sensed SOI time corresponds to a time point associated with a discernible decrease in the fuel pressure proximal to a fuel injector. The sensed EOI time corresponds to a time point associated with a discernible inflection point in the injector voltage from a decreasing voltage to an increasing voltage.

Determining the sensed EOI time corresponding to the time point associated with a discernible inflection point in the injector voltage from a decreasing voltage to an increasing voltage is known to a person having ordinary skill in the art. Sensed injection duration is an elapsed time period between the sensed SOI time and the sensed EOI time. A maximum decrease in the fuel pressure proximal to the fuel injector during the fuel injection event correlates with a maximum fuel injection rate, which can be determined using suitable calibration methods for an embodiment of the system. The maximum fuel injection rate and the sensed injection duration can be used to calculate or otherwise determine an injected fuel mass for the fuel injection event.

Based on the fuel request signal 215, the total fuel calculation module 220 determines the pilot fuel injection quantity (Q), the DT injection module 222 determines the appropriate dwell times for injecting the fuel into the cylinders 118, and the SOI module 224, and the SOI and/or EOI times to achieve the fuel request indicated by the fuel request output from the active fuel demand controller 200.

The active fuel demand controller 200 stores various models and algorithms which are calculated to output the fuel request signal 215. Unlike employing a full physical combustion model configured to actively model each combustion cycle of the vehicle, the active fuel demand controller 200 implements a feed-forward neural network module 202.

The feed-forward neural network module 202 is defined according to one or more constructive units referred to as neurons ($\Phi_j$). The neurons receive one or more inputs (representing dendrites), and sum them to produce an output (representing a neuron's axon or a node). Usually the sums of each node are weighted, and the sum is passed through a non-linear function known as an activation function or transfer function, which is described in greater detail below. The transfer functions usually have a sigmoid shape, but they can also take the form of other non-linear functions, piecewise linear functions, or step functions. They are also often monotonically increasing, continuous, differentiable and bounded. The thresholding function is utilized to build logic gates referred to as threshold logic A neural network can be generally represented as follows:

$$g(u(t)) = \sum_{j=1}^{N_h} w_j \Phi_j \left( b_j + \sum_{i=1}^{m} a_{i,j} u_i(t) \right) + a_0 \qquad \text{[Equation 1]}$$

where, g(u(t)) is a modeled function of the input vector of engine torque at time (t);
$N_h$, is a hidden layer;
$\Phi_j$ is number of neurons;
$a_{i,j}$ are parameters of functional forms to be learned;
m is a dimension of the input vector u including delays;
$u_i(t)$ is an input vector of the engine torque model at time "t"; and
$w_j$ are weights from the neurons to the output in neural networks.

The functional form of Equation 1 describes a liner combination of hidden layer ($N_h$) neurons ($\Phi_j$). In a non-linear neural network, the $\Phi_j$'s are sigmoidal functions such as the hyperbolic tangent. In at least one embodiment, linear neural networks can be utilized where the are identity functions.

Three properties exist with respect to non-linear neural networks: (i) universal approximation, (ii) parsimony and (iii) complexity control. Universal approximation refers to a feature where neural networks can approximate arbitrarily well any function—providing $N_h$ is large enough (a property shared by other function classes such as polynomials and Fourier series). Accordingly, neural networks are parsimonious because their number of internal parameters ($1+mN_h+2N_h$, for $a_0$, the $a_{i,j}$'s the $b_j$'s and $w_j$'s) grow linearly with the dimension of the input space, m. Complexity control means that by changing Nn one can control the variance of the function independently from other factors such as the number of data or the input space dimension.

In at least one embodiment, the feed-forward neural network module 202 learns data by solving the non-linear least-squares scenario represented as:

$$\min_{w,a} \frac{1}{\ell} \sum_{i=1}^{\ell} (y(t) - g(u(t_i)))^2 + \lambda \left( \sum_j w_j^2 + \sum_{i,j} a_{i,j}^2 \right)$$ [Equation 2]

where, l is a number of learning examples or data points used in empirical error;
a is a parameter of functional forms to be learned; and
λ is a regularization weight factor;

In at least one embodiment, the feed-forward neural network module 202 executes a Levenberg-Marquardt optimization algorithm to solve the non-linear least-squares scenario (i.e., see Equation 2), which is a gradient-based optimizer that, for non-linear least-squares problems, is a quasi-Newton solution technique. The feed-forward neural network module 202 evaluates the gradient of the objective function (see Equation 2) with respect to the parameters (or weights) w and a is performed by a computationally efficient implementation of chain rule differentiation, a technique known as "error back-propagation" in the field of neural networks.

The last penalty term in Equation (2), referred to as weight decay, can be viewed as a computational regularization strategy, and can be viewed as closely related to functional regularization. The feed-forward neural network module 202 can execute early stopping computation regularization strategies for taking into consideration the weight decay.

Based on the operations and computation strategies of the feed-forward neural network module 202 described above, the feed-forward neural network module 202 actively models each combustion cycle based on at least (a) the main fuel quantity needed to reach an indicated torque request, and (b) the start of main injection angle needed to reach MFB50. In at least one embodiment, the main fuel quantity can be based on the BMEP torque request. MFB generally refers to the normalized quantity ranging from 0 to 1 which describes the process of chemical energy release as a function of crank angle. Accordingly, MFB50 refers to fuel demand and combustion efficiency corresponding to the crank angle at which 50% of fuel mass is burnt.

In at least one non-limiting embodiment, the neural network combustion model is based on an accumulated fuel mass approach. For instance, the combustion cycles of the engine 102 are modeled according to an estimated rate of released chemical energy that is proportional to the energy associated with the fuel quantity made available for combustion at the considered time instant. The initial estimation can be based on a cylinder pressure curve and a heat release estimation.

The combustion model can also take into consideration the air measurement/estimation (EGR quantity, intake and exhaust pressure and temperature, oxygen concentration, etc.) and fuel parameters (fuel pressure, injection pattern: number, size and angle position of small pulses, start of injection of main pulse). Accordingly, the neural network combustion model is capable of providing high torque accuracy in transient conditions (e.g., acceleration events, deceleration events, etc.).

Figure 3:
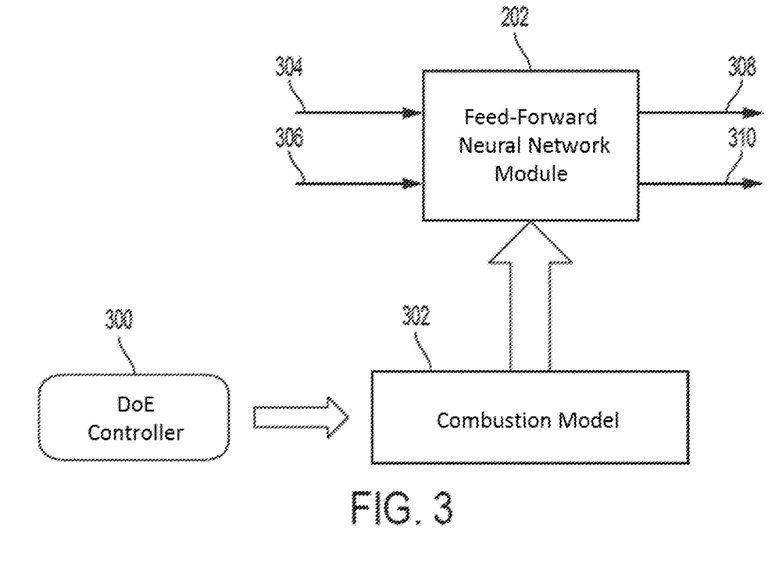
FIG. 3 is a block diagram illustrating a process of training a feed-forward neural network controller according to a non-limiting embodiment.

Referring now to FIG. 3, the feed-forward neural network module 202 can be trained off-line (e.g., using dyno testing data and/or test bench data), and once trained can be implemented (i.e., installed) into the active fuel demand controller 200. In at least one embodiment, a real-time physical engine model controller 300 such as Design of Experiment (DoE) controller 300, for example, generates a neural network combustion model 302 off-line based on a series of simulations carried out using a real-time physical engine model. The combustion model 302 is defined by a neural network structure including a plurality of neurons as described above. In at least one embodiment, the neural network combustion model 302 includes approximately 10 neurons to approximately 20 neurons. In at least one embodiment, the set of simulations is identified according to a DoE methodology. For example, a space-filling (Latin Hypercube) method can be performed to generate the DoE tests to be simulated by the physical engine model controller 300.

By exploiting the real-time capability of the neural network combustion model 302, a very large number of simulations can be carried out to train the feed-forward neural network module 202. As a result, the trained feed-forward neural network module 202 is able to replicate the results of the physical combustion model generated by the physical engine model controller 300 with high accuracy, but at a much lower computational time compared to conventional ECUs that implement a fully physical combustion model (i.e., a non-neural network combustion model).

Still referring to FIG. 3, the neural network combustion model is loaded into the feed-forward neural network module 202 (i.e., the memory of the feed-forward neural network module 202), which is then installed into the active fuel demand controller 200. Once the neural network combustion model 302 is loaded in the feed-forward neural network module 202, the feed-forward neural network module 202 can actively determine a fuel demand setpoint and a SOI angle for achieving the indicate torque demand setpoint and MFB50 setpoint corresponding to the indicated torque request input by the operator of the vehicle. That is, based on a torque setpoint indicated by a torque setpoint signal 304 and a MFB50 setpoint indicated by a MFB50 signal 306, the feed-forward neural network controller 202 utilizes the neural network combustion model stored therein to generate a fuel demand signal 308 and a SOI signal 310 indicating the necessary SOI angle for achieving a fuel demand corresponding to the MFB50 and torque setpoints.

While the above disclosure has been described with reference to exemplary embodiments, it will be understood by those skilled in the art that various changes can be made and equivalents can be substituted for elements thereof without departing from its scope. In addition, many modifications can be made to adapt a particular situation or material to the teachings of the disclosure without departing from the essential scope thereof. Therefore, it is intended that the inventive teachings not be limited to the particular embodiments disclosed, but will include all embodiments falling within the scope of the application.

What is claimed is:

1. An automotive internal combustion engine comprising:
a cylinder to combust a mixture of air and fuel;
a crankshaft rotatably coupled to the internal combustion engine and configured to generate a drive torque in response to combusting the mixture of air and fuel;
an engine fuel control system including a fuel injector configured to inject the fuel into the cylinder based on an injector setpoint signal generated by the internal combustion engine fuel control system; and
an engine control unit (ECU) configured to determine a torque request to output a fuel request signal that controls the injector setpoint signal thereby controlling an amount of the fuel to inject into the cylinder, the engine control unit including an active fuel demand controller having a neural network controller installed therein, the neural network controller configured to generate a fuel setpoint signal based on the torque request and a combustion model of the internal combustion engine that is generated by a neural network installed in the neural network controller, and to generate a start of injection (SOI) signal indicating a start time at which to inject the fuel based on a rotational angle of the crankshaft and the combustion model generated by the neural network,
wherein the neural network actively models each combustion cycle of the internal combustion engine based on a main fuel quantity needed to reach an indicated torque request, and a start of main injection angle needed to reach 50% of burnt fuel mass (MFB50), and actively generates the fuel setpoint signal and the start of injection (SOI) signal in response to each actively modeled combustion cycle;
wherein the engine fuel control system is located upstream from the neural network controller included in the active fuel demand controller, and wherein the active fuel demand controller outputs the fuel request signal to the engine fuel control system based on the fuel setpoint signal and the SOI signal actively generated by the neural network controller, and
wherein the fuel injector injects the fuel into the cylinder based on the fuel request signal to generate the drive torque indicated by the torque request.

2. The internal combustion engine of claim 1, wherein the neural network includes at least one neuron that defines the combustion model.

3. The internal combustion engine of claim 2, wherein the at least one neuron includes a plurality of neurons ranging from 10 neurons to 20 neurons.

4. The internal combustion engine of claim 3, wherein the torque request is based on a brake torque request.

5. The internal combustion engine of claim 4, wherein the brake torque request is based on at least one of an axle torque, frictional loss realized by the internal combustion engine, and a pumping energy loss realized by the internal combustion engine.

6. The internal combustion engine of claim 2, further comprising an engine air control system including a throttle valve configured to adjust the air delivered into the cylinder.

7. The internal combustion engine of claim 6, wherein the engine air control system adjusts the throttle valve to vary the air delivered into the cylinder based on the fuel request signal.

8. An engine control system configured to control an internal combustion engine, the engine control system comprising:
at least one air/fuel sensor configured to measure at least one of an amount air delivered to a cylinder of the internal combustion engine and an amount of fuel delivered to the cylinder of the internal combustion engine;
a crankshaft sensor configured to measure at least one of a rotational angle of a crankshaft and a rotational speed of the crankshaft rotatably coupled to the internal combustion engine;
an engine fuel control system including a fuel injector configured to inject the fuel into the cylinder; and
an engine control unit (ECU) in signal communication with the at least one air/fuel sensor, the crankshaft sensor, and the engine fuel control system, the ECU configured to determine a torque request to output a fuel request signal that controls an injector setpoint signal thereby controlling the amount of the fuel to inject into the cylinder, the ECU including an active fuel demand controller having a neural network controller installed therein, the neural network controller configured to generate a fuel setpoint signal based on the torque request and a neural network that defines a combustion model of the internal combustion engine, and to generate a start of injection (SOI) signal indicating a start time at which to inject the fuel based on the rotational angle of the crankshaft and the combustion model generated by the neural network,
wherein the neural network actively models each combustion cycle of the internal combustion engine based on a main fuel quantity needed to reach an indicated torque request, and a start of main injection angle needed to reach 50% of burnt fuel mass (MFB50), and actively generates the fuel setpoint signal and the start of injection (SOI) signal in response to each actively modeled combustion cycle,
wherein the engine fuel control system is located upstream from the neural network controller included in the active fuel demand controller, and wherein the active fuel demand controller outputs the fuel request signal to the engine fuel control system based on the fuel setpoint signal and the SOT signal actively generated by the neural network controller, and
wherein the fuel injector injects the fuel into the cylinder based on the fuel request signal to generate the drive torque indicated by the torque request.

9. The engine control system of claim 8, wherein the neural network includes at least one neuron that defines the combustion model.

10. The engine control system of claim 9, wherein the at least one neuron includes a plurality of neurons ranging from 10 neurons to 20 neurons.

11. The engine control system of claim 10, wherein the torque request is based on a brake torque request input to the ECU.

12. The engine control system of claim 11, wherein the brake torque request is based on at least one of an axle torque applied to the crankshaft, frictional loss realized by the internal combustion engine, and a pumping energy loss realized by the internal combustion engine.

13. The engine control system of claim 9, further comprising an engine air control system including a throttle valve configured to adjust the air delivered into the cylinder.

14. The engine control system of claim 13, wherein the engine air control system adjusts the throttle valve to vary the air delivered into the cylinder based on the fuel request signal.

15. A method of controlling an internal combustion engine in an automotive vehicle, the method comprising:
- delivering a mixture of air and fuel into a cylinder of the internal combustion engine;
- combusting the mixture of air and fuel in the cylinder;
- receiving an indicated torque request;
- generating, in response to the indicated torque request, a drive torque; via a crankshaft rotatably coupled to the internal combustion engine, in response to combusting the mixture of air and fuel;
- actively modeling, via a neural network controller including a neural network, each combustion cycle of the internal combustion engine based on a main fuel quantity needed to reach the indicated torque request, and a start of main injection angle needed to reach 50% of burnt fuel mass (MFB50);
- actively generating, via the neural network controller, a fuel setpoint signal based on a torque request input to the internal combustion engine;
- defining, via the neural network controller, a combustion model of the internal combustion engine, and actively generating, via the neural network, a start of injection (SOI) signal indicating a start time at which to inject the fuel based on a rotational angle of the crankshaft;
- outputting a fuel request signal indicative of an amount of the fuel to inject into the cylinder based on the torque request, the fuel request signal actively generated according to the fuel setpoint signal and the SOI signal; and
- injecting the fuel into the cylinder based on the fuel request signal to generate the drive torque indicated by the torque request.

16. The method of claim 15, wherein the neural network includes at least one neuron that defines the combustion model.

17. The method of claim 16, wherein the at least one neuron includes a plurality of neurons ranging from 10 neurons to 20 neurons.

18. The method of claim 17, wherein the torque request is based on a brake torque request input to the vehicle.

19. The method of claim 18, wherein the brake torque request is based on at least one of an axle torque, frictional loss realized by the internal combustion engine, and a pumping energy loss realized by the internal combustion engine.

20. The method of claim 16, further comprising adjusting a position of a throttle valve to vary the air delivered into the cylinder based on the fuel request signal.

* * * * *